United States Patent [19]
Myers

[11] 3,963,211
[45] June 15, 1976

[54] ROTARY VALVE
[75] Inventor: Edward Bariess Myers, Oreland, Pa.
[73] Assignee: Honeywell Inc., Minneapolis, Minn.
[22] Filed: Oct. 23, 1974
[21] Appl. No.: 517,382

[52] U.S. Cl. ............................ 251/85; 251/86; 251/298
[51] Int. Cl.² ....................................... F16K 25/00
[58] Field of Search ........................... 251/84–88, 251/177, 298

[56] References Cited
UNITED STATES PATENTS

| | | | |
|---|---|---|---|
| 1,614,117 | 1/1927 | Geldhof | 251/298 X |
| 2,889,845 | 6/1959 | Kimm et al. | 251/298 X |
| 2,998,957 | 9/1961 | Vulliez | 251/86 |
| 3,042,358 | 7/1962 | Anderson | 251/177 X |
| 3,494,589 | 2/1970 | Mumma | 251/298 |
| 3,749,358 | 7/1973 | Bates | 251/298 |

FOREIGN PATENTS OR APPLICATIONS

| | | | |
|---|---|---|---|
| 550,238 | 8/1956 | Belgium | 251/86 |
| 1,282,630 | 12/1961 | France | 251/86 |

Primary Examiner—Henry T. Klinksiek
Attorney, Agent, or Firm—Laurence J. Marhoefer; Lockwood D. Burton; George E. Bodenstein

[57] ABSTRACT

An eccentrically rotatable control valve having a spherical shaped valve plug is positioned in a valve chamber to regulate the flow of fluid there through. The valve plug is retained in a loosely captured position by means of a bolt and spring to the end of a valve actuating arm for flexible, swivel movement thereon. This construction enables the plug to be initially rotated from a completely open position into line contact with a part of the valve seat in the wall of the chamber, and to then be jointly tilted and rolled about this seat part into and out of fluid tight surface to surface contact with the entire valve seat. The plug and arm are mounted on and for limited longitudinal movement with an associated valve actuator shaft that extends through the chamber. The latter construction provides a means by which the plug can center itself in a properly seated fluid tight position on the seat in the event that the valve seat is out of properly aligned seating surface engagement with the plug.

10 Claims, 10 Drawing Figures

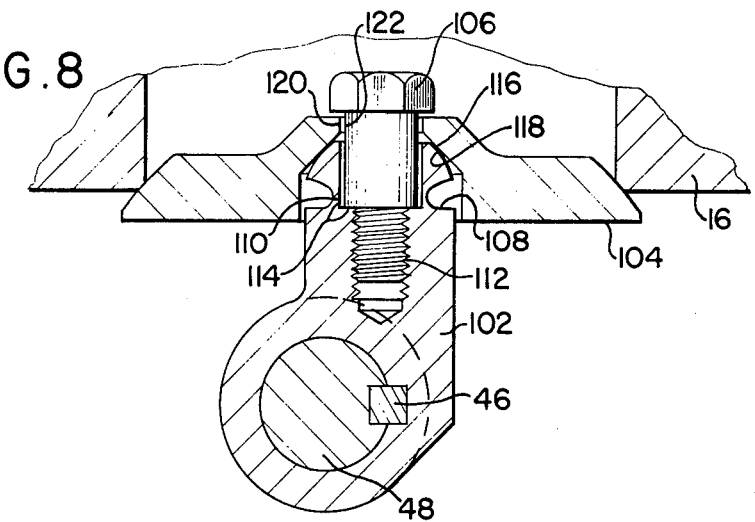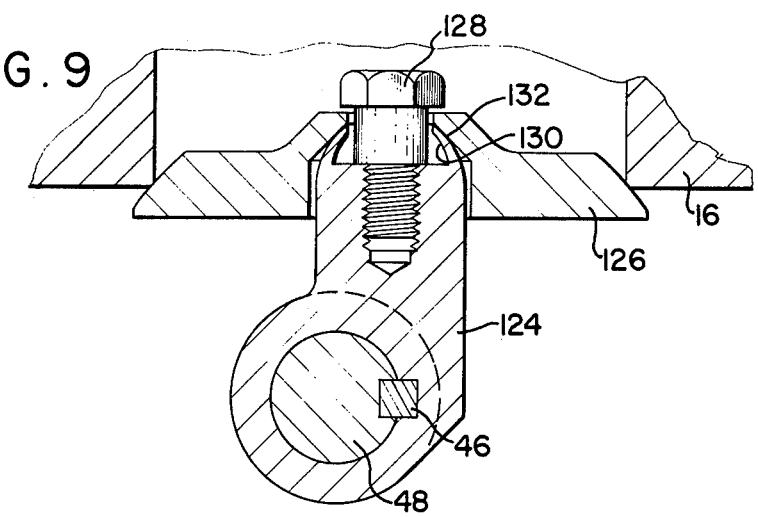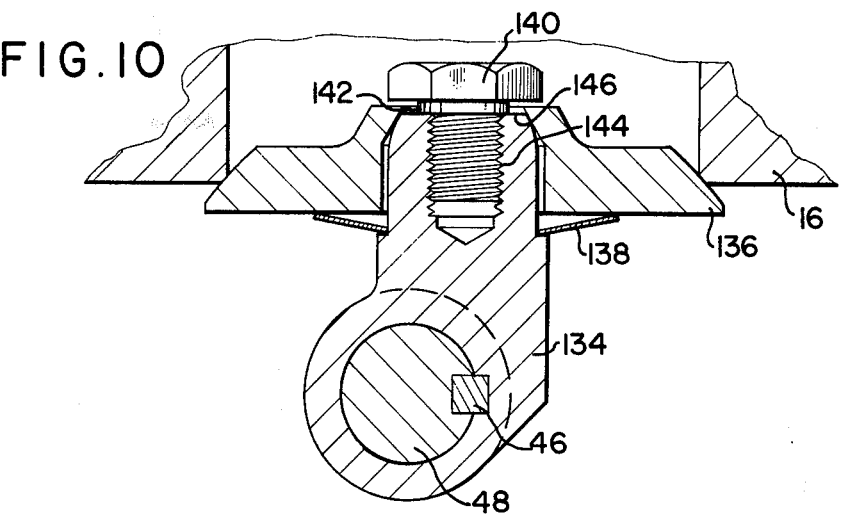

ROTARY VALVE

BACKGROUND OF THE INVENTION

1. Field of the Invention

The invention relates to improvements in eccentric rotary valve for flow control.

2. Description of the Prior Art

There have been many different types of spherical plugs used in prior art valves that are constructed for movement into and out of engagement with a seat port forming a wall of a valve chamber. One example of a prior art rotary valve that is used for this purpose is shown on Hans D. Baumann U.S. Pat. No. 3,623,696.

The spherical plug that is disclosed in the aforementioned patent and an arm which extends therefrom are of a solid one-unit construction. The valve plug and arm are rotatable eccentrically in a valve chamber relative to a port seat by means of an actuator shaft mounted in the wall portions of the valve chamber.

As the actuating shaft is rotated in one direction, it rotates the spherical face of the plug eccentrically relative to the seat face of the port seat. When a portion of the plug comes in contact with the seat, the longitudinal axis of the arm commences to bend and this results in the spherical face of the plug being rubbed against the seat as continued rotation of the plug toward its closed valve position occurs.

Additional similar rubbing action as that just described will take place between the spherical contact portion of the plug and the seat of the seat port when the plug is moved along the seat toward its open position.

From the aforementioned description, it can be seen that a high unit load in the form of a rubbing force is applied on a small segment of the seat port during each successive port closing and port opening operation. This rubbing action thus causes or tends to cause extensive wear to occur between the rubbing surfaces of the spherical plug and the surfaces of the seat port. The greatest extent of wear occurs where the segments of the plug and/or seat port portions are first brought into contact with one another as the valve is closed.

As the valve continues to cycle between an open and closed position, this wearing action intensifies and results in uneven wear occurring between the plug and the seat port and results in increased leakage occurring between the plug and the seat port.

Another difficulty that has been encountered with prior art valves of the aforementioned type and as set forth in detail in the Charles Bates U.S. Pat. No. 3,749,358 is that the seats of many of these valves must be properly shimmed in order to effect perfect alignment and sealing. Such a shimming operation is not desirable since it takes a considerable amount of time to continuously assemble and disassemble the valve until a desirable size shim is selected to provide an acceptable seal between the plug and seat port. The shimming operation has been found to be necessary even though expensive machine shop procedures are effected to machine the parts of these valves to precise tolerances in an attempt to eliminate the valve leakage problem.

Another problem encountered with the valves of the aforementioned type is that an undesired, abnormally high torque is required to close such valves since the plug arm, that extends between the back of the plug and the actuator shaft, is required to be flexed as the aforementioned rubbing action occurs between the plug and its seat port. Use of such one-unit plug-arm construction will, therefore, require an expensive, rather large size actuator to effect the opening and closing of such rotary valves.

Another difficulty in the use of the aforementioned prior art rotary valve is that the entire valve, including the actuator shaft, arm and plug must be completely removed as a single unit from its assembled position in the valve chamber in order to replace a defective plug with a new one. Replacement is then accomplished by sliding the arm and plug unit off one end of the actuating shaft and slidably mounting a new unit on the shaft.

For the aforementioned reasons, a substantial amount of down time in a process being controlled by the aforementioned rotary valve will be required when replacing a defective plug with a new one.

BRIEF DESCRIPTION OF THE DRAWINGS

A better understanding of the present invention may be had when the following detailed description is read in connection with the accompanying drawings in which:

FIG. 8 shows a different form of the connection between the actuator arm and plug that differs from the arrangement shown in FIG. 2;

FIG. 9 shows another different form of the connection between the actuator arm and plug; and FIG. 10 shows an additional different form of the connection between the actuator and plug.

SUMMARY OF THE INVENTION

Figure 1:
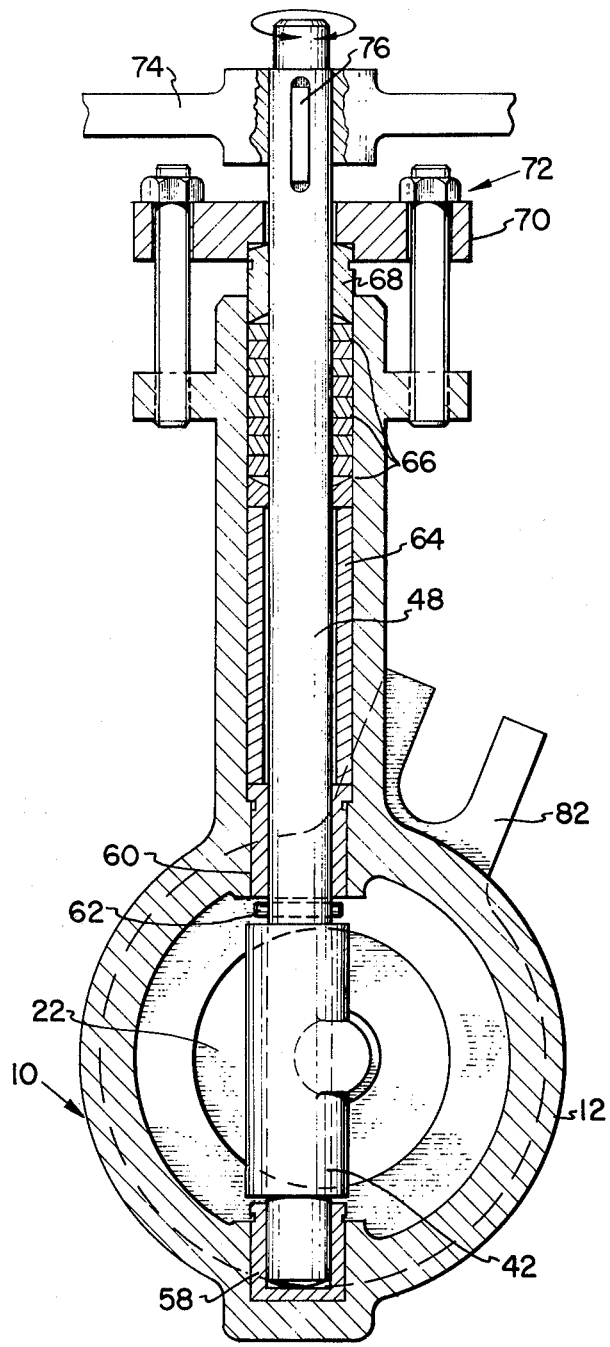
FIG. 1 is a sectional view taken through the valve chamber and the rotary valve mounted therein.

It is a major object of the invention to provide an improved rotary control valve.

It is a further object of the present invention to provide an improved valve as set forth which features a bolt and spring connection to mount a spherical plug on an associated actuating arm of an eccentrically-rotatable control valve.

It is still another object of the present invention to provide a connection of the aforementioned type in which the head of the bolt is loosely retained in a recess in the plug to thereby allow the plug to be mounted in a loose, captured position on its associated arm for flexible, swivel movement thereon.

It is another object of the invention to provide a valve of the aforementioned type that can be rotated from a completely open position into line contact with a part of a valve seat within the wall of a valve chamber to then be jointly tilted and rolled about the seat part into and out of fluid tight surface to surface contact with the entire valve seat.

It is yet another object of the invention to provide a valve of the aforementioned type that has a means by which the plug can center itself in the aforementioned seated condition in the event that the valve seat is out of properly aligned seating engagement with the plug.

In accordance with the present invention, there is provided a spherical section shaped plug member mounted by means of a cap bolt and a spring biasing member to an outer end of an actuating arm of an eccentrically rotatable control member. The actuating arm is mounted on a rotatable shaft for effecting movement of the plug member into and out of engagement with a port seat in a valve chamber.

Mounting the plug in the aforementioned manner allows the plug to be swiveled against the biasing means and about the end of the arm when the spherical section surface of the plug is brought into contact with a seat portion of the port seat and as it is brought into and out of closed fluid tight surface to surface contact with the port seat.

The aforementioned construction allows a spherical portion of the plug to be moved by the rotatable shaft and actuating arm into line contact with a portion of the seat portion in the valve chamber and the remaining spherical portion of the plug to then be rolled about the port seat that is already engaged with the plug until the plug is brought into fully closed contact with the seat of the seat port. The spring biasing member maintains a force on the plug while the aforementioned rolling movement of the plug occurs and while the actuator arm simultaneously moves the plug into fluid tight engagement with the seat of the seat port.

Since the aforementioned plug construction allows the plug to be rolled on the seat while it is moved into and out of a closed position, it substantially eliminates the leakage problem due to rubbing taking place between the plug and seat that is inherent in the previously mentioned prior art rotary valves.

The aforementioned construction also allows the plug to be moved into and out of engagement with the seat of its seat port with an inexpensive small size actuator since such a rotary valve plug structure requires much less torque than that required by the previously mentioned prior art rotary valve.

The rotary valve of the present invention is provided with a spring biased holding action as referred to above which allows the plug to always be brought into fluid tight sealing contact with its seat and will thus not require shimming as has heretofore been required with the previously mentioned prior art rotary valve.

Since the plug of the present invention is attached to its actuator arm by means of a cap bolt this plug can readily be removed and replaced with a new plug by merely removing the port seat and its retainer and disconnecting the cap bolt from the actuator arm. Since the valve of the present invention does not, therefore, require removal of the entire valve from the valve chamber as is the case with the prior art rotary valve previously referred to; the down time in a process being controlled by the valve of the present invention will, therefore, be considerably reduced from that required with the prior art rotary valve.

DESCRIPTION OF THE PREFERRED EMBODIMENT

Detailed Description

Figure 3:
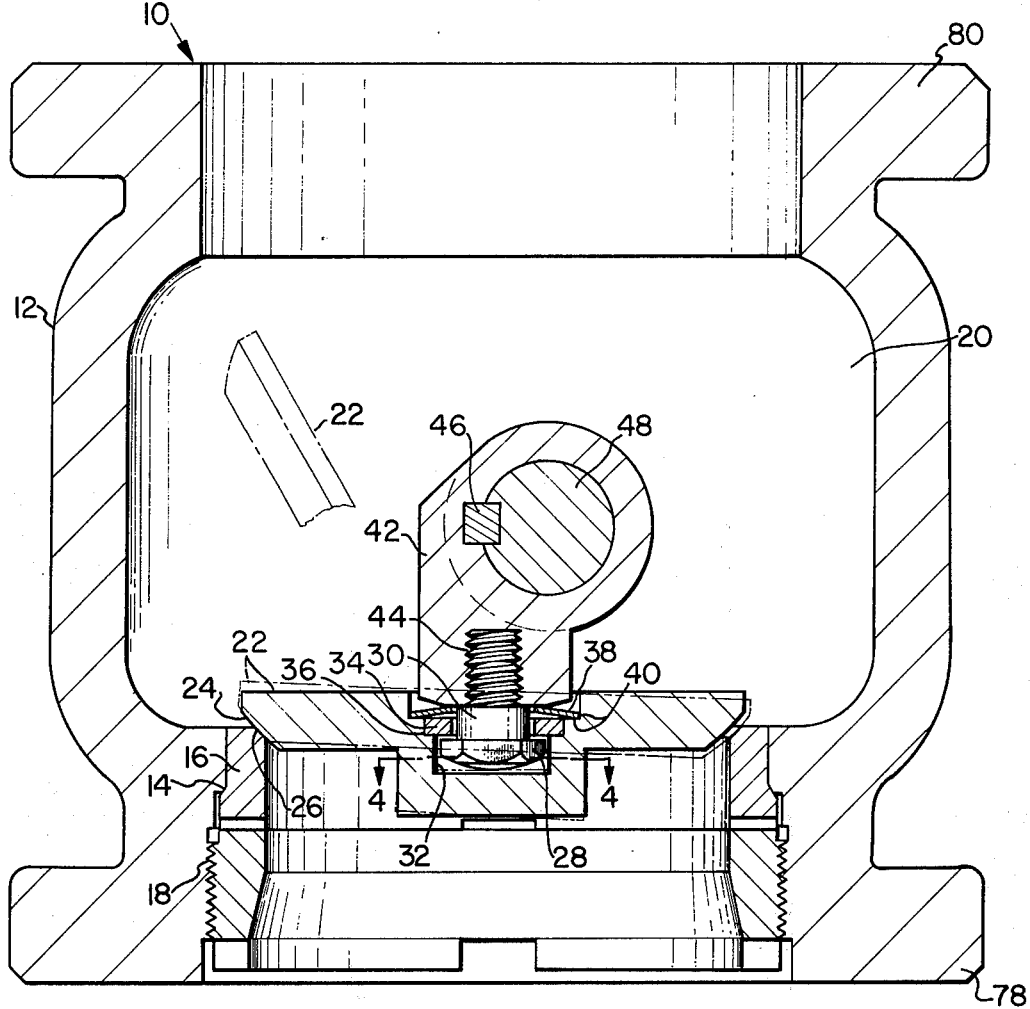
FIG. 3 is a partial cross-sectional view taken along the line 3—3 of FIG. 2.
Figure 2:
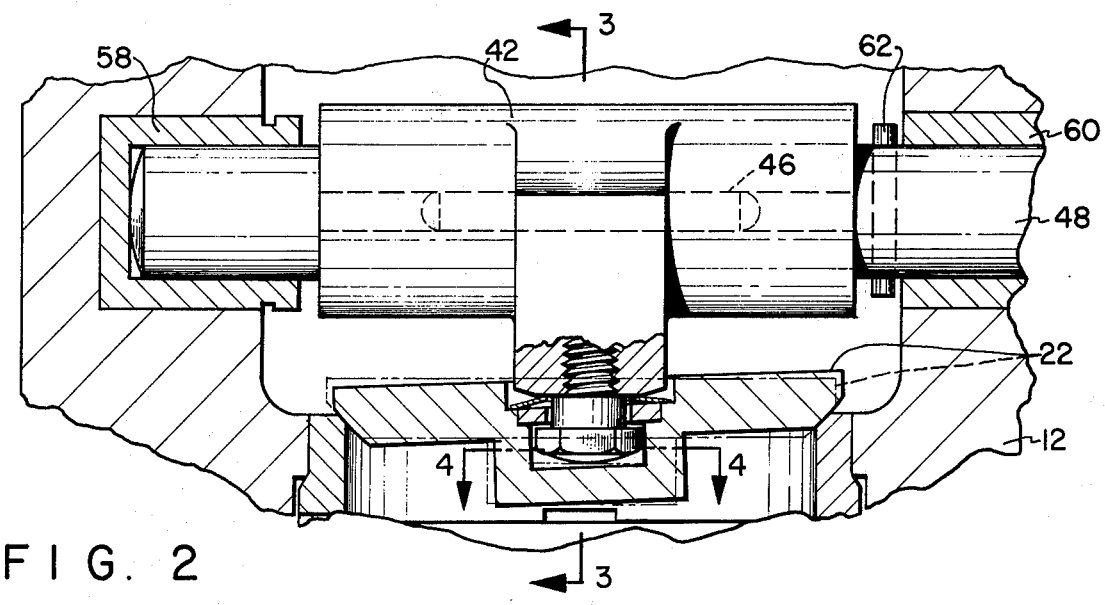
FIG. 2 shows in cross-section from the connection between the actuator arm and plug of the valve shown in FIG. 1.

For an understanding of the preferred embodiment of the invention, reference will be first made to FIGS. 1, 2 and 3. A valve or valve assembly 10 has a unitary valve body 12 provided with an annular shoulder 14. A ring 16 is held against the shoulder 14 by a threadedly adjustable retainer ring 18. The ring 16 forms a seat portion in a wall of a valve chamber 20 formed in the body 10.

FIG. 2 shows in dot dash line form a valve plug 22 having a spherical seating surface 24 that is in a fully opened position in a valve chamber. FIGS. 2 and 3 show in solid line form the position that the plug 22 will be in when it is in an intermediate, partially closed position. These figures also show the valve plug 22 in a fully closed dot dot dash line contacting position and against an annular chamfered seat 26 of chamfered seat port 16.

Figure 4:
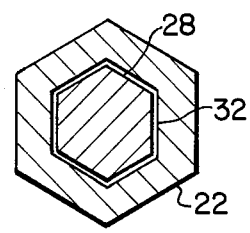
FIG. 4 is a sectional view taken along the line 4—4 of FIG. 2.

A hexagonal shaped head 28 of a cap bolt 30 fits into a slightly larger complementary hexagonal shaped internal wall 32 of the plug 22 as is best shown in FIGS. 3 and 4.

A ring 34 attached as by welding to an annular recessed wall portion 36 of the plug 22 retains the head of the cap bolt 30 in a loose, captured position on the plug 22.

A Belleville spring washer 38 is positioned about a shank portion of the bolt 30 and has its outer peripheral edge in contact with a wall 40 which forms another recess in a rear surface portion of the plug 22.

FIG. 3 shows the inner annular portion of the spring washer 38 retained in compressed engagement with the center portion of the top rounded end surface of an actuating arm 42 when the cap screw 30 has been rotated into the threaded recess wall 44 in the arm 42.

The arm 42 is fixedly mounted by means of a key 46 on an actuator shaft 48. The shaft 48 is supported at opposite sides of the actuating arm 42 on bearings 58, 60 that are mounted on the valve body 12. A stop pin 62, passing through the shaft 48, actuating arm 42, cap bolt 30 and the plug 22 are constructed for movement along bearings 58, 60 as a single unit to the right of the position shown in FIGS. 1 and 2. Space is available at the left end of the shaft 48 for movement of the arm 42, cap bolt 30 and plug 22 in a right to left direction from the last mentioned position.

The actuating shaft 42 extends through a bearing 60, a spacer 64, packing 66, and a gland 68 that is retained in place by a gland follower 70, and a tie bolt and nut connection means 72.

An actuating leveer 74 is mounted by means of a key 76 to the end of the shaft 48. A suitable manually actuated handle and/or an electric motor shaft actuating device, not shown, is connected to the lever 74.

Each end of the valve body 12 has a flange 78, 80 to accommodate the bolting of the valve assembly 10 to associated spaced flanges of a conduit, now shown.

The body 12 of the valve 10 also has a bifrucated portion 82 extending therefrom for engaging the shank of one of the bolts, not shown, that are used to connect the body of the valve 10 to the aforementioned flanges of the conduit and to retain the valve in a non-rotatable position with respect to the conduit.

ADDITIONAL EMBODIMENTS OF THE INVENTION

Figure 5:
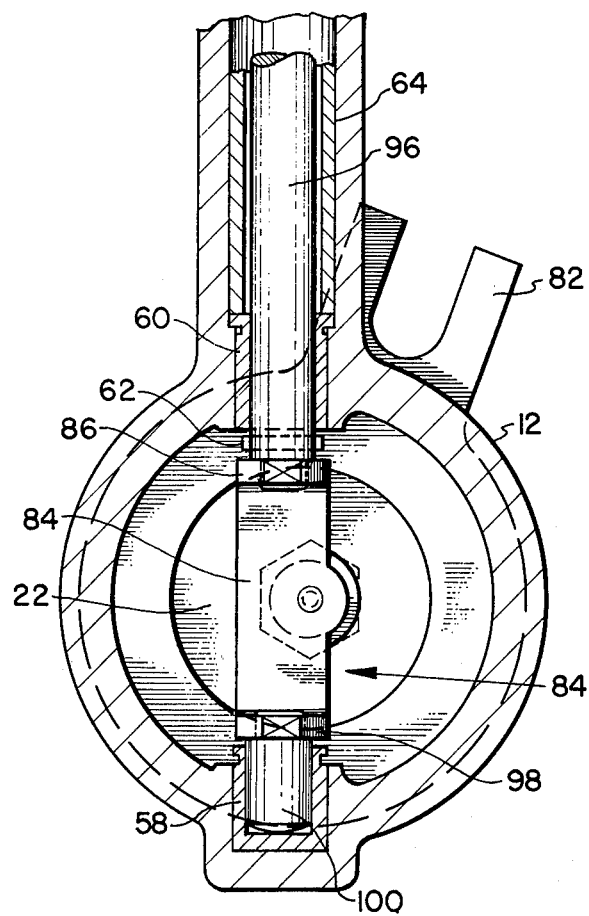
FIG. 5 is a sectional view similar to FIG. 1 that shows a modified form of the invention.
Figure 7:
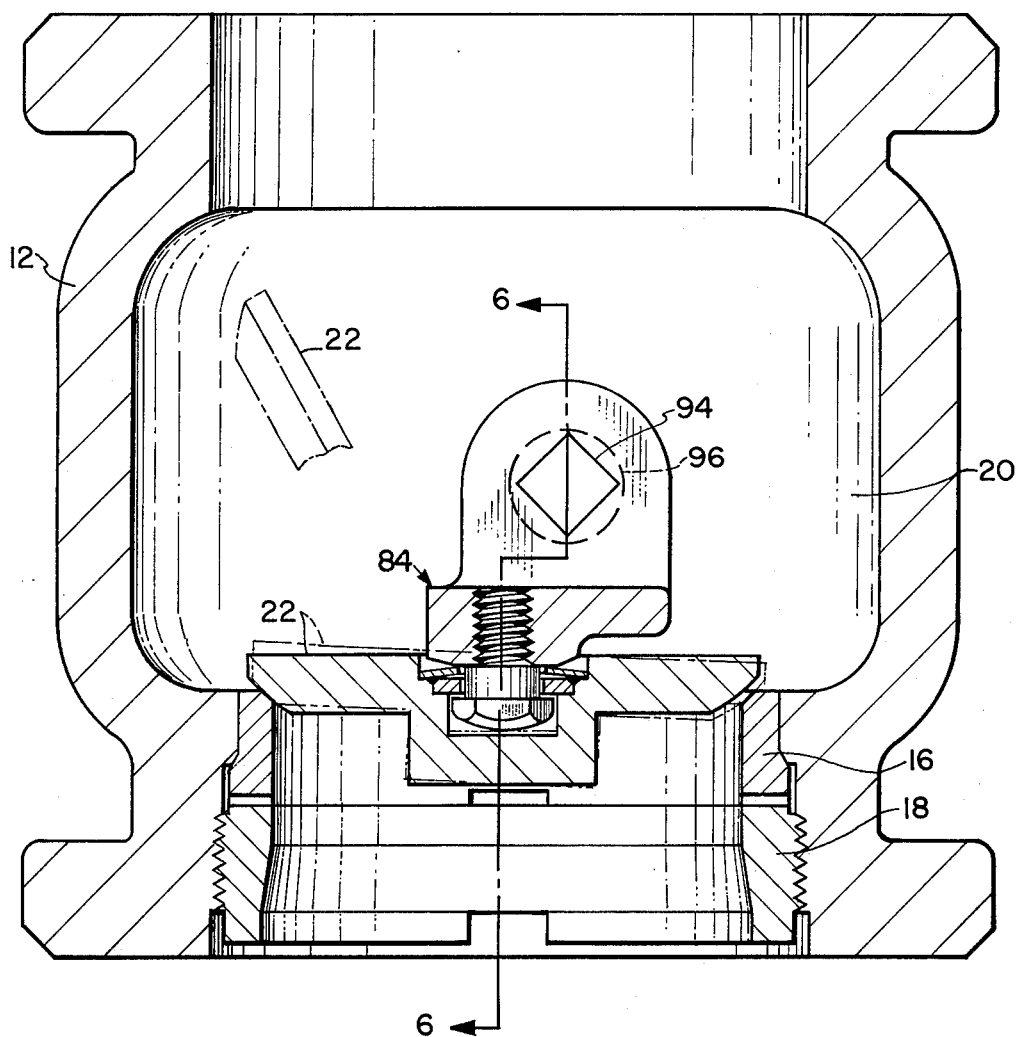
FIG. 7 is a partial cross-sectional view taken along the line 7—7 of FIG. 6.
Figure 6:
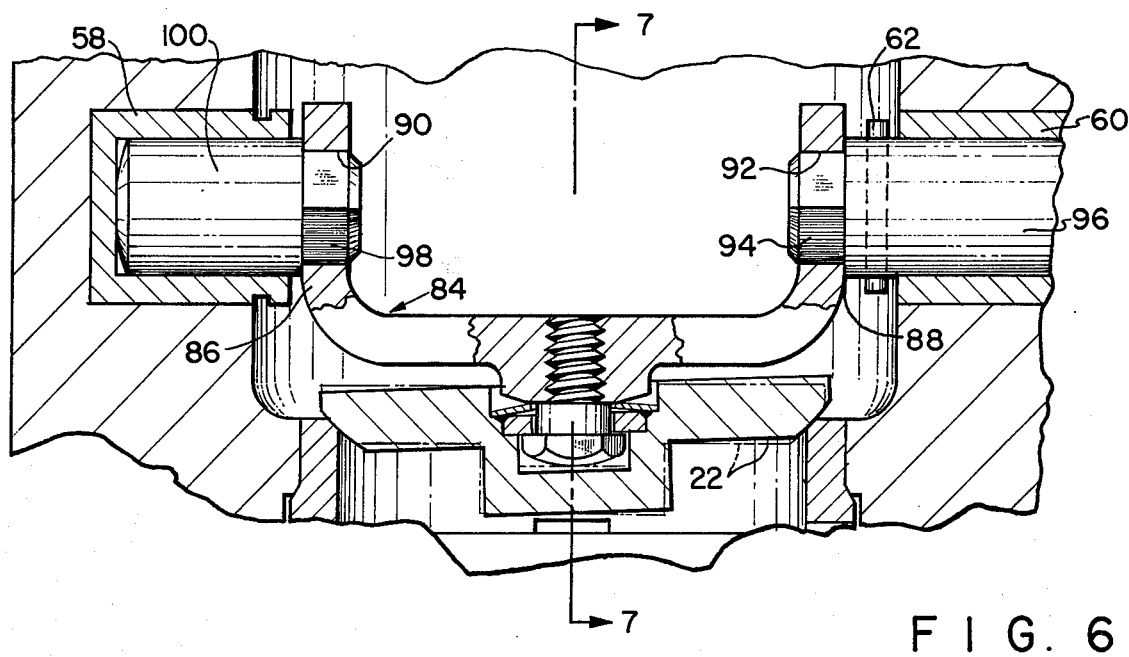
FIG. 6 shows an end elevation view of the yoke connection between the valve actuator shaft and plug shown in FIG. 5 and taken along section line 6—6 of FIG. 7.

The form of the invention as shown in FIGS. 5 to 7 differs from the arrangement shown in FIGS. 1 to 4 in that the plug actuating arm 84 employed in FIGS. 5 to 7 is in the form of a yoke 84 rather than being of a sleeve shaped construction 42.

Another difference is that each of the arms 86, 88 of the yoke 84 has an associated wall 90, 92 forming a square shaped opening therein. A square end portion 94 of an actuator shaft 96 is retained in push-fit engagement with the square shaped wall 92 formed in the arm 88 for rotation therewith.

The square shaped wall 90 formed in the other arm 85 of the yoke 84 is mounted in a similar push-fit manner on the square end portion 98 of a pintle shaft 100 that is mounted in the bearing 58. Although not shown in FIG. 5, the end of the shaft 96, packing 66, a gland 68, a gland follower and an actuating lever 74 are mounted thereon in the same manner as that shown in FIG. 1.

It can be seen from a comparison of FIGS. 2 and 3 with FIGS. 6 and 7 that the use of the yoke or U-shaped actuator arm 84 shown in FIGS. 6 and 7 provides a greater free flow of fluid to the valve chamber containing the yoke 84 than is possible when an actuator arm 42 is used for this purpose.

FIG. 8 shows an additional embodiment of the rotary valve 10 which includes an actuator arm 102, valve plug 104 and bolt connection 106. The valve construction of FIG. 8 differs from the previously mentioned valve construction in that the construction of FIG. 8 does not require a Belleville spring washer 38. This is accomplished by providing an annular recess 108 in an upper end of the actuator arm 102 whereby an annular thin wall portion 110 is formed between the upper end of the actuator arm 102 and its remaining lower end portion.

The threaded shank portion of the cap bolt 106 is retained in a fixed position with the internal threads 112 on the actuator arm 102 by the lock hard tight engagement between the cap bolt 106 and the base of the cylindrical recess 114 formed in actuator arm 102. A conical inner wall 116 of the plug 104 is in contact with a wall 118 that is of a spherically shaped configuration. An annular space is formed between an inner wall portion 120 of the plug and the outer cylindrical shank portion 122 of the cap bolt 106. It can be seen from the aforementioned description that the thin annular wall 110 provides a flexible spring for the upper spherically shaped portion of the actuator arm 102 on which the plug 104 is pivoted during its initial contact with the seat port 16 and its closed position shown in FIG. 8.

FIG. 9 shows another form of the rotary valve 10 which includes an actuator arm 124, valve plug 126 and bolt 128. FIG. 9 differs from the FIG. 8 valve construction in that an inner annular recess wall portion 132 of the plug 126 is in contact with the outer surface of a thin annular wall 130 formed on the actuator arm 124. The thin annular wall 130 provides a flexible spring like part about which the plug 126 is pivoted as it is rotated between the previously ddescribed, partially closed intermediate position and the closed valve position shown in FIG. 9.

FIG. 10 shows still another form of the rotary valve which includes an actuator arm 134, valve plug 136, a Belleville spring washer 138, and a bolt 140.

The bolt 140 has an annular shoulder portion 142. The bolt 140 is retained in a fixed position with internal threads 144 on the actuator arm 134 by the lock hard engagement existing between the lower surface of the bolt shoulder 142 and the top surface 146 of the actuator arm 134.

MODE OF OPERATION

The valve plug 22 shown in FIGS. 1 to 3 is mounted by means of the cap bolt 28, the spring washer 38 and the arm 42 mounted on an actuator shaft 43 for rotatable movement therewith. The longitudinal center of the shaft 48 is displaced to the right, as viewed in the drawings, of the longitudinal center line of the seat port 16.

When the shaft 48 is rotated in a clockwise direction, as viewed in FIG. 3, the plug will initially be moved from its completely open dot dash line position shown inside the valve chamber 22 to its intermediate, partially closed solid line position. When the plug 22 is moved to this intermediate solid line position, a portion of its outer spherical surface 24 will be brought into line contact with the bevel surface portion of the seat 26 of seat port 16.

As additional rotary motion of the plug 22 in a clockwise direction occurs, the plug 22 is tilted in a rolling fashion by the force applied to it by the spring washer 38 as angular displacement of this washer 38 about the longitudinal center line of the shaft 48 occurs. While this rolling movement of the plug 22 takes place, the top surface of the head of the cap bolt 28 will initially remain out of contact with the surface forming the base of the recess 32 in the plug 22.

The aforementioned combined tilted and rolling movement of the plug 22 about a portion of the seat 24 of the seat port 16 continues until the entire outer spherical surface 24 of the plug 22 is brought into surface to surface fluid tight sealing contact with the seat 26 as shown in dot dot dash line form. Immediately prior to the time the plug is moved to its fully closed position, the round top surface of the head of the cap screw 28 will be forced by the rotation of arm 42 into firm surface to surface contact with a wall forming the base of the recess 32 in the plug 22.

A clearance is shown between the stop pin 62 and the end of the bearing 60 in FIG. 2. The shaft 48, actuating arm 42, nut 28 and the plug 22 are, therefore, in a position to be shifted slightly in a left to right direction. The aforementioned parts can also be shifted in a right to left direction when the stop pin 62 is in a position that is closer to the end of the bearing 60 than that shown in FIG. 2. Mounting the plug 22 and arm 42 as a unit in the aforementioned manner for longitudinal movement on the shaft 48 allows the spherical surface 24 of the plug 22 to seat itself in good line to line sealing engagement with the annular beveled seating surface 26 that is formed on the end of the seat port 16. This self-seating characteristic of the plug 22 is beneficial in providing good tight valve closing, particularly under a condition in which an eccentricity or other misalignment occurs between the plug 22 and seat 26.

The self-aligning rotary valve 10 of this invention thus allows the spherical seating surface 24 of the plug 22 to be simultaneously tilted and rolled into and out of aligned sealing contact with the seating surface 26 of the port seat 16.

The aforementioned construction for the rolling plug 22 constructed in accordance with the present invention will, therefore, substantially reduce the wear and increase the useful life of rotary valve plugs and seats over the prior art rubbing type plug and seat arrangements to which reference has heretofore been made.

The plug 22 shown in FIGS. 5 to 7 and the plugs 104, 126, 136 of FIGS. 8, 9 and 10 are each mounted on an associated actuator arm 84, 102, 124, 130, respectively. Each of these arm mountings is constructed to enable the spherical seat of each of their respective plugs 22, 104, 126, 136 to be tilted and rolled, in a self-aligning manner, into engagement with the annular beveled seat surface 26 of the seat port 16 in the same manner as that set forth above under the descriptions of FIGS. 1 to 3.

In FIGS. 5 and 6, a yoke 84 is shown in place of a sleeve on an actuator arm as shown in FIGS. 1 to 3 for mounting the plug 22 for longitudinal, self-aligned movement on an actuating shaft. Since the yoke 84 takes up less space in the valve chamber 20 than the unitary actuator arm, the sleeve 42 and its associated solid shaft as shown in FIGS. 1 to 3, the yoke arrangement shown in FIGS. 5 and 6 will allow a greater flow of fluid to pass through the valve chamber than the arrangement shown in FIGS. 1 to 3. The flow Cv, or a factor relating to the efficiency of the valve, of the valve shown in FIGS. 5 and 6 will thus be at a higher value than the Cv value of the valve construction shown in FIGS. 1 to 3.

Since the actuator arm 102; 104 shown in FIGS. 8 and 9 have a resilient, movable upper end, they can, therefore, apply the same type of resilient force to their respective plugs 104; 126 as the spring 38 of FIGS. 2 and 3 applies to its associated plug 22.

The rotary plug arrangement of FIG. 10 has a spring 138 which is similar to and functions in substantially the same manner as the spring 38 shown in FIGS. 2 and 3.

The plug 22 can be readily removed from its mounted position 44 on the actuator arm 42 by removing the seat and retaining ring 18 and the port seat ring 16, and rotating the plug 22 so that its inner flat side surfaces 34, will be brought into contact with the complementary flat side surfaces of the head of the cap screw 28. Continued rotary movement of the plug 22 will cause unscrewing of the captured bolt 28 from the arm 42 whereby the bolt 28 and plug 22 can be removed from the body 20 of the rotary valve 10. A replacement plug containing another similar captured bolt is then threadedly engaged with the threaded wall portion 44 of the arm 42 until the bottom end of the bolt is brought into surface to surface contact with the bse of the threaded wall formed in the arm 42.

The aforementioned connection between the plug 22 and the associated actuator arm 42 thus avoids the need for removing the plug, actuator arm and actuating shaft from the body of a valve in order to remove the plug therefrom as has been required with the previously mentioned prior art rotary valves, the plug and actuator arm of which are of a unitary construction.

The embodiments of the invention in which an exclusive property or privilege is claimed are defined as follows:

1. A control valve for regulating the flow of a fluid, comprising a body portion that forms a valve chamber, an annular seat ring forming an opening in the wall of said chamber, a valve actuator arm mounted at one of its ends for eccentric rocking movement in said chamber about an axis that is radially displaced from the axis of said seat ring, a plug having a spherical shaped seat and a wall forming a recess in a base portion thereof, a connector having a head portion at one end thereof positioned in said recess and a shank extending therefrom that has an end portion connected for movement with said actuator arm, an annular retaining ring positioned in spaced apart relationship to the head portion of said connector, said retaining ring being connected to the recessed wall portion and positioned in spaced relationship about a remaining shank portion of said connector for maintaining said head portion in loose captured relationship in said recess, a biasing means extending between said plug and an outer end of said valve actuator arm to which said shank is connected to apply a biasing force to said plug, said connector and said biasing means enabling said eccentrically mounted plug to be swiveled into line contact with a part of said seat ring and to be jointly tilted and rolled about said seat ring part into and out of fluid tight line surface to surface engagement with an entire annular seating surface on said seat ring.

2. The control valve as defined in claim 1 wherein the biasing means is positioned about a portion of said connector that extends between a portion of the recessed wall in the base of said plug adjacent said retaining ring and said valve actuator arm.

3. The control valve as defined in claim 1 wherein said biasing means is a spherically shaped washer constructed of a resilient material.

4. The control valve as defined in claim 1 wherein the connector is a bolt and wherein the said head portion is the head of said bolt.

5. The control valve as defined in claim 1 wherein the connector is a bolt, the said head portion is the head of said bolt and wherein threads on said bolt and a threaded wall formed in said arm comprise said connection between said connector and said arm.

6. The control valve as defined in claim 1 wherein the connector is a bolt, said head portion is the head of said bolt, threads on said bolt and a threaded wall formed in said arm provide said connection between said connector and said arm, and said recess in the base of said plug being of a multi-wall configuration to accommodate the insertion of flat side portions of the head of said bolt therein to thereby enable the plug and said bolt to be rotatably mounted on and rotatably removed as a unit from said arm.

7. The control valve as defined in claim 1 wherein the actuator arm is connected to an actuating shaft that is positioned to effect said eccentric rotatable rocking movement of said plug into and out of said tilting and rolling line engagement with said seat ring, and wherein said shaft is mounted for limited longitudinal movement along bearing support members that are mounted on a wall portion of said valve chamber to enable the plug to center itself in a fluid tight seated position on the annular seat ring when the latter is out of properly aligned sealed seating surface enagagement with the seat of the plug.

8. The control valve as defined in claim 1 wherein the valve actuator arm is of a U-shaped configuration, and wherein the legs of the U-shaped arm are each mounted for rocking movement with an actuator shaft that is mounted on the wall of said chamber.

9. A control valve for regulating the flow of a fluid, comprising a body portion that forms a valve chamber, an annular seat ring forming an opening in the wall of said chamber, a valve actuator arm mounted at one of its ends for eccentric rocking movement in said chamber about an axis that is radially displaced from the axis of said seat ring, a plug having a spherical shaped seat and a wall forming a cone-shaped recess in a base portion thereof, a connector having a head portion at one end thereof positioned in spaced relationship over a seating side portion of said plug and having a shank portion thereof extending in spaced relationship through a bored out portion of said plug containing said cone-shaped recess and extending in spaced relationship through an opposite end of said arm, the end of said shank being connected for movement with said actuator arm, said bored out arm portion having an annular spherical shaped outer wall in rolling contact with the wall forming said cone-shaped recess in said plug, an annular groove in said arm adjacent its said annular spherical-shaped outer wall, said grooved out portion of said arm providing a biasing force between said valve actuator arm and said plug, said connector and said biasing means provided by said grooved out portion of said actuating arm enabling said eccentrically mounted plug to be swiveled against said biasing force of said grooved out portion of said actuator arm, and the spherical seat of said plug to be simultaneously tilted and rolled into and out of fluid tight engagement with an annular seating surface on said seat ring.

10. A control valve of regulating the flow of a fluid, comprising a body portion that forms a valve chamber, an annular seat ring forming an opening in the wall of said chamber, a valve actuator arm mounted at one of its ends for eccentric rocking movement in said chamber about an axis that is radially displaced from the axis of said seat ring, a plug having a spherical shaped seat and a wall forming a cone-shaped recess in a base portion thereof, a connector having a head portion at one end thereof positioned in spaced relationship over a seating side portion of said plug and having a shank portion thereof extending through a bored out portion of said plug containing said cone-shaped recess and extending in spaced relationship through an opposite end of said arm, the end of said shank being connected for movement with said actuator arm, said last-mentioned end of said actuator arm terminating in a resilient spherical-shaped wall, said resilient wall being in surrounding spaced relationship with an annular portion of the shank of said connector and in resilient rolling contact with the wall forming said cone-shaped recess in said plug to thereby provide a biasing means between the actuator arm and said plug, said connector and said biasing means of said actuator arm enabling said plug on said eccentrically mounted arm to be swiveled against the bias of said biasing means provided by the resilient wall of said actuator arm, and the spherical seat of said plug to be simultaneously tilted and rolled into and out of fluid tight engagement with an annular seat ring surface of said seat ring.

* * * * *